(12) United States Patent
Maurer

(10) Patent No.: US 7,367,753 B2
(45) Date of Patent: May 6, 2008

(54) MILLING CUTTER

(75) Inventor: Eugen Maurer, Ober-Morlen (DE)

(73) Assignee: Jakob Lach GmbH & Co. KG, Hanau (DE)

( * ) Notice: Subject to any disclaimer, the term of this patent is extended or adjusted under 35 U.S.C. 154(b) by 0 days.

(21) Appl. No.: 11/531,305

(22) Filed: Sep. 13, 2006

(65) Prior Publication Data

US 2007/0274790 A1     Nov. 29, 2007

(30) Foreign Application Priority Data

Sep. 14, 2005    (DE)    .................. 10 2005 004 015

(51) Int. Cl.
*B23C 5/02*    (2006.01)
(52) U.S. Cl. ..................... 407/53; 407/56; 407/59
(58) Field of Classification Search .............. 407/53, 407/56, 58, 59, 11, 46, 66–70, 33, 113–119
See application file for complete search history.

(56) References Cited

U.S. PATENT DOCUMENTS 5,193,944 A * 3/1993 Nishimura ................ 407/53
5,272,940 A * 12/1993 Diskin ..................... 76/108.6
5,944,456 A * 8/1999 Shirley et al. ............. 407/42
6,692,197 B2 * 2/2004 Villa ........................ 407/35

* cited by examiner

*Primary Examiner*—Willmon Fridie, Jr.
(74) *Attorney, Agent, or Firm*—William E. Jackson; Stites & Harbison PLLC

(57) ABSTRACT

12. A rotationally drivable milling cutter has a cylindrical carrier body (10), which is equipped on its circumference with a plurality of cutting bodies (12) comprising a cutting material that is harder than hard metal. The cutting bodies (12) are embodied in platelike form and are each embodied and disposed such that the leading region of the radially outer circumferential edge forms the cutting edge, the adjacent side face (15) forms the first face with a negative rake angle, and the top face (17) diametrically opposite the bottom face forms the flank. To that end, the cutting bodies (12) are each secured with their bottom face on the end face of blind bores (30), in the circumferential face thereof, that are oriented with the angle to the shortest connecting line between the center point of the end face and the center longitudinal axis of the carrier body (10) such that the side face (15) adjacent to the cutting edge forms the predetermined rake angle.

11 Claims, 1 Drawing Sheet

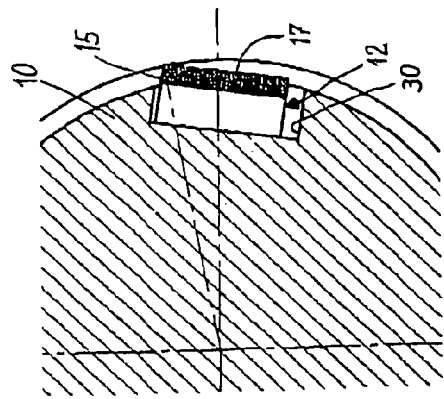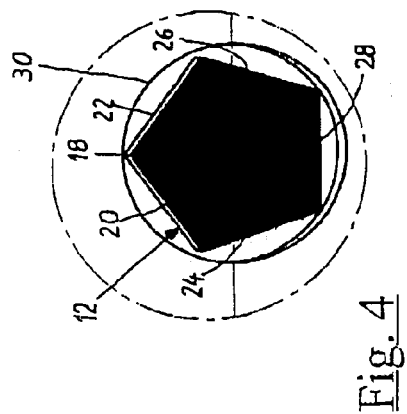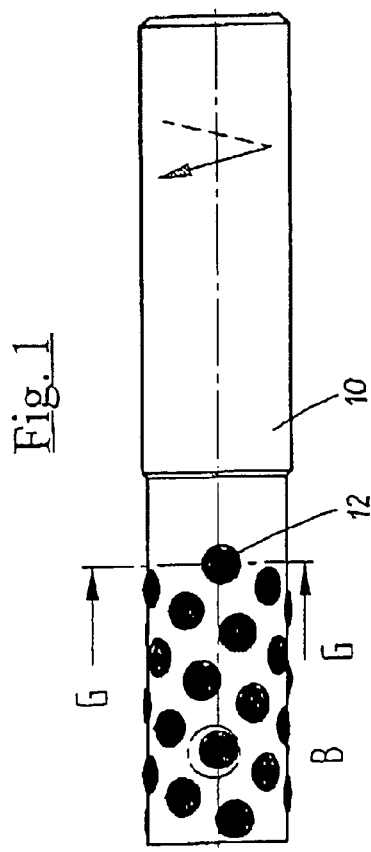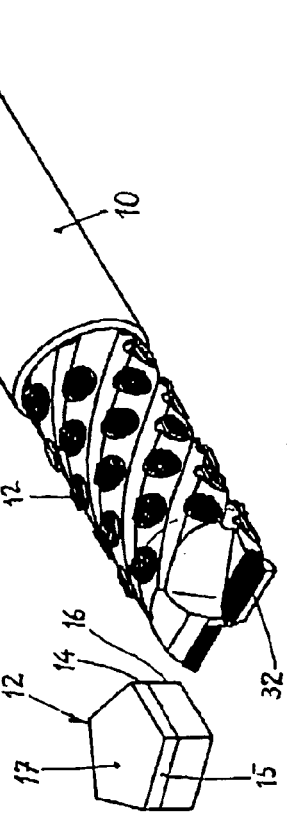

MILLING CUTTER

The invention relates to a rotationally drivable milling cutter, having a carrier body that is equipped on its circumference with a plurality of platelike cutting bodies that comprise a cutting material that is harder than hard metal, in each of which bodies the leading region of the radially outer circumferential edge forms the cutting edge, the adjacent side face forms the first face with a negative rake angle, and the top face diametrically opposite the bottom face forms the flank.

One such milling cutter is known from German Patent DE 38 28 746 C1. It describes a disk milling cutter with recesses on the circumference, in which platelike cutting bodies not described in further detail are mounted by means of cassettes screwed on the face end to the disklike carrier body. This way of securing the cutting bodies is limited to disk milling cutters and cannot be considered for equipping an end milling cutter with many cutting bodies disposed axially side by side. Moreover, the cassettes are expensive and take up a great deal of space, so that the cutting bodies can be disposed only with a relatively great intermediate spacing.

There are many tools that have to be machined yet comprise materials, such as glass- or carbon-fiber-reinforced plastics, laminates, composite materials, graphite, or mineral structural materials, against which cutting edges of tools rapidly become dull. The same is true for machining ceramic and hard metal green compacts. In these cases, hard metal tools are unsuitable because their service lives are too short. Tools on the order of grinding wheels, with small galvanically bonded diamond particles scattered over the circumference, have the disadvantage that the grinding dust plugs up the chip spaces, and heating and destruction of the tool can then ensue.

In large drilling machines, for instance for offshore use, platelike cutting bodies of polycrystalline diamond are soldered to the circumference of a rotationally driven carrier body in an oblique position, but in such a way that the first face in each case is formed by the smoothed top face of a cutting body.

The object of the invention is to create a milling cutter of the type defined at the outset which in a way similar to a grinding tool functions in a more hammering manner rather than cutting, for instance in order to smooth edges and burrs of a workpiece made of carbon-fiber-reinforced synthetic resin, such as parts of a horizontal stabilizer of an airplane, and is relatively simple to produce and has a long service life even under difficult conditions of use.

This object is attained according to the invention in that the cutting bodies with their bottom face are each secured on the end face of blind bores, in the circumferential face thereof, the blind bores being oriented with the angle relative to the shortest connecting line between the center point of the end face and the center longitudinal axis of the carrier body such that the side face bordering on the cutting edge forms the predetermined rake angle.

The proposed milling cutter can have a very simple construction, since the platelike cutting bodies require no cassettes or clamping device for fastening them. Preferably, they are simply glued or soldered onto the carrier body. The advantage of simplicity is especially effective since there is a trend to use a relatively large number of relatively small cutting bodies, for instance 36 of them or even substantially more, with a diameter at their outline of possibly only from 2 to 5 mm. The negative rake angle, for instance of −20°, allows a strong cutting edge of 90°, for example, in which case there is no risk of breakage. The platelike cutting bodies of polycrystalline diamond, which are round in their outset state, are preferably simply cut to the desired contour, for instance by means of electroerosive processes, and the side walls can continue to be perpendicular to the bottom face and/or to the top face. All that is needed is accordingly to cut off individual portions straight from the round plates in order to obtain completed cutting bodies. In the individual case, the commercially available, round, polycrystalline cutting bodies can even be used as cutting bodies in their originally round shape, or in other words without machining.

With such cutting bodies with cutting edges of rectangular cross section, to obtain a negative rake angle, the bottom face of the cutting bodies can be embodied as an oblique face, and they can thus be secured to the end faces of radially oriented blind bores. However, a version in which the platelike cutting bodies have the same height as every point of their bottom face is preferable. The oblique position, corresponding to the negative rake angle, is produced in a preferred feature of the invention by drilling blind bores not precisely radially but rather obliquely, relative to the pivot axis (that is, the center longitudinal axis), to the radial direction into the circumferential face of the carrier body such that the cutting bodies of uniform height, secured by their bottom faces to the end faces of the blind bores, have the correct oblique position for the aforementioned negative rake angle.

The diameter of the blind bores should expediently fit the outline of the platelike cutting bodies; specifically, it should be only enough greater that a connection by material engagement, such as a soldered or adhesive connection, also comes about between the side wall of the cutting bodies and the bore wall. In this way, an even stronger connection is obtained between the cutting bodies and the carrier body. Given a sufficiently strong connection by material engagement between the cutting bodies and the carrier body, the fastening can be done, instead of on the end faces of blind bores, even on flattened faces, created for instance by milling, of a cylindrical circumferential face of the carrier body.

The disposition of the cutting bodies on the circumference of the carrier body is preferably done in parallel rows, which can extend axially parallel or obliquely to the pivot axis of the carrier body. The cutting bodies are disposed in staggered fashion in successive rows in the direction of rotation. The gap between two cutting bodies next to one another in the same row can for instance be closed or bridged by a cutting body of the next row in order, or by one cutting body in each of the next two or three rows.

Exemplary embodiments of the invention are described in further detail below in conjunction with the drawings. Shown are:

FIG. 1, a side view of a many-toothed end milling cutter in accordance with the invention;

FIG. 2, a perspective view of a milling cutter of FIG. 1, with additional drill bits;

FIG. 3, a perspective view of one of the cutting bodies soldered to the circumference of the milling cutter;

FIG. 4, as a detail "B" of FIG. 1 and on a larger scale, a plan view on a soldered-on cutting body of FIG. 3 and the blind bore, receiving it, in the circumferential face of the end milling cutter;

FIG. 5, a cross section through the milling cutter taken along the section line G-G in FIG. 1, in the region of one of the cutting bodies.

The many-toothed milling cutter shown in FIGS. 1 and 2 has the shape of an end milling cutter, comprising a cylindrical carrier body 10 offset in stepped fashion, which is equipped in a front portion with cutting bodies 12 on its circumference. One of the cutting bodies is shown in perspective in FIG. 3 and in plan view in FIG. 4. As shown in FIG. 3, it has a two-layered construction, with an upper layer 14 of polycrystalline diamond (PCD) and a lower layer 16 of hard metal. Instead of PCD, the upper layer 14 may also comprise some other extremely hard cutting material, such as cubic boron nitride (CBN). The two layers 14, 16 are solidly sintered to one another in the production process, so that they behave like a one-piece element. The cutting bodies 12 are available relatively inexpensively on the market in circular form and are cut by the tool industry to whatever shape or contour is desired. Electroerosive cutting processes are preferably employed, for instance using a wire as the cutting electrode. The top face 17 of the PCD or CBN layer 14, which face is already polished in advance and typically serves in other rotary tools and milling cutters as a first face, does not require any further machining.

In the version shown, beginning with a commercially available, circular, two-layer cutting body 12, a regular polygon has been produced by means of five cuts, shown in FIG. 3, made perpendicular to the polished top face and to the lower bottom face. In this example, this polygon has an outline with a diameter of 3.71 mm. Each of the cutting bodies 12 is glued or soldered to the circumference of the carrier body 10 with an orientation to the pivot axis of the milling cutter such that as shown in FIG. 2, one of the five corners points in the circumferential direction in which the cutting bodies 12 are moved during machining, by means of the rotary drive motor of the milling cutter. In the view in FIG. 4, the leading corner of the cutting body is marked 18. The two upper, straight peripheral edges 20, 22 that meet at the corner 18 are the cutting edges of the cutting body 12 shown, during the machining of a workpiece. Together, they extend over the greatest width (measured parallel to the pivot axis of the milling cutter) of the cutting body 12. Since the two straight peripheral edge portions 24, 26 that follow to the rear in the direction of rotation form an acute angle, and thus the cutting body 12 tapers to the rear, these edges 24, 26 no longer come into use in the machining of a workpiece. Therefore, if once the cutting edges 20, 22 become worn it is decided that the cutting bodies 12 be detached from the carrier body 10 and firmly soldered or bonded on again in a rotated position, these edges can come to be used as cutting edges, either individually or together with what is now the rearmost circumferential edge 28.

It is understood that the platelike cutting bodies 12 in plan view may also have the shape for instance of a regular heptagon or nonagon, or a triangular shape. In principle, regular or irregular quadrilateral or other polygonal shapes with an even number of corners are not precluded, either. In certain applications, the round cutting bodies on the market, which are available with various diameters and layer thicknesses of the PCD or CBN layer, need not be machined at all but instead can be secured directly to the circumference of the carrier body 10 in such a way that the polished top side forms the outside and flank.

In order not to have to machine the bottom face of the cutting bodies 12 with a curvature yet still to obtain a large fastening area on the circumference of the carrier body 10, the cutting bodies 12 are secured to the flat end face of shallow blind bores in the circumferential face of the carrier body 10 by soldering or adhesive bonding. The diameter of the holes, marked 30 in FIG. 4, is expediently only approximately from 2/10 to 3/10 mm larger than the outline of the cutting bodies 12. In this way, a connection by material engagement also comes about between the cutting bodies 12 and the cylindrical wall of the bore 30. In the case of a polygonal bottom face of the cutting bodies 12, however, a tighter fit between the outline of the cutting bodies 12 and the bore 30 may also be chosen, so that the cutting bodies 12 are seated by positive engagement at their circumference in the bore 30.

In the preferred embodiment, the polished top face of the cutting bodies 12 at the cutting edges 20, 22 forms a right angle with the associated side faces 15 of the cutting bodies 12, as is shown in FIG. 5. It is also desirable for the polished top side 17, functioning as the flank, of the cutting bodies 12 to form a clearance angle of 15° to 25°, for instance, and in the specific case preferably 20°. Accordingly, the rake angle defined by the side face of the cutting body 12 is negative, with an angle of −20° in this example.

So that the cutting bodies 12 will have the aforementioned position, the blind bores 30 must not be drilled precisely radially into the circumferential face of the cylindrical carrier body 10 but instead must be drilled such that the bore axis extends with intermediate spacing from the pivot axis of the milling cutter, and the depth of the vb, at the point where the leading corner 18 of the cutting body 12 is located, is smaller than on the diametrically opposed side in the region of the edge 28. Thus solely by means of the oblique position of the blind bores 30, the negative rake angle of 20°, for instance, and the corresponding clearance angle of 20° are established. It is understood that the blind bores 30 need to be drilled only so deeply that at their bottom, a flat end face is created, on which the cutting bodies 12, which in this example are prismatic, can be secured for instance by soldering or adhesive bonding or in some other suitable way, and the cutting edges 20, 22 are located radially so far outside the cylindrical circumferential face of the carrier body 10 that removing chips from the first face 15 is unproblematic.

The milling cutter shown in FIG. 2 is equivalent to the milling cutter of FIG. 1, but on its front end it additionally has at least one drill bit 32. Here, there are two drill bits 32, which comprise PCD or CBN and are soldered or adhesively bonded to the carrier body 10. With this kind of milling cutter, a shallow workpiece can for instance first be drilled through and then machined further, beginning at the drilled hole, by means of the cutting bodies 12.

The invention is not limited to end milling cutters of relatively small diameter, but instead is also suitable for disk milling cutters of substantially greater diameters. Work is normally done with circumferential speeds of 40 to 60 m/s, for example, at the cutting edges. However, in principle, the circumferential speed or cutting speed has no upper limit. The size of the rake angle is adapted to the chip removal conditions in the individual case.

The invention claimed is:

1. A rotationally drivable milling cutter, having a carrier body (10) that is equipped on its circumference with a plurality of platelike cutting bodies (12) that comprise a cutting material that is harder than hard metal, in each of which bodies the leading region (18 through 22) of the radially outer circumferential edge forms the cutting edge, the adjacent side face (15) forms the first face with a negative rake angle, and the top face (17) diametrically opposite the bottom face forms the flank, characterized in that the cutting bodies (12) with their bottom face are each secured on the end face of blind bores (30) in the circumferential face of the carrier body, the blind bores being oriented with the angle relative to the shortest connecting line between the center point of the end face and the center longitudinal axis of the carrier body (10) such that the side face (15) bordering on the cutting edge (18 through 22) forms the predetermined rake angle.

2. The milling cutter as defined by claim 1, characterized in that the platelike cutting bodies (12) have the same height at every point of their bottom face, and the center longitudinal axes of the blind bores (30) form an acute angle with the shortest connecting line between the center point of their end face and the center longitudinal axis of the carrier body (10).

3. The milling cutter as defined by claim 1, characterized in that the angle between the center longitudinal axes of the blind bores (30) and the shortest connecting line between the center point of each of their end faces and the center longitudinal axis of the carrier body (10) amounts to 0°, so that the blind bores (30) are radially oriented, and the bottom face of the cutting bodies (12) is embodied as an oblique face, with an acute angle, corresponding to the negative rake angle, relative to the top face (17) of the cutting bodies (12).

4. The milling cutter as defined in claim 1 characterized in that the cutting bodies (12) are joined by their bottom face by material engagement, for instance by soldering or adhesive bonding, to the end face of the bores (30).

5. The milling cutter as defined in claim 1 characterized in that the diameter of the blind bores (30) is only just enough greater than the outline of the cutting bodies (12) that a connection by material engagement also comes about between the side wall (15) of the cutting bodies (12) and the bore wall (30).

6. The milling cutter as defined in claim 1 characterized in that the cutting bodies (12) comprise a layer (14) of polycrystalline diamond or cubic boron nitride, forming the top face (17), on a lower layer (16) of hard metal joined integrally to it and forming the bottom face.

7. The milling cutter as defined in claim 1 characterized in that the side faces (15) of the cutting bodies (12) extend perpendicular to the top face (17).

8. The milling cutter as defined in claim 1 characterized in that the negative rake angle amounts to approximately −15° to −25°, preferably −20°.

9. The milling cutter as defined in claim 1 characterized in that the cutting bodies (12) in top view have the shape of a pentagon and are secured to the circumference of the carrier body (10) in such a way that they point with one corner (18) in the cutting direction.

10. The milling cutter as defined in claim 1 characterized in that the cutting bodies (12) are disposed in staggered fashion in rows that extend axially parallel or obliquely to the pivot axis and in successive rows.

11. The milling cutter as defined in claim 1 characterized in that it is provided with at least one drill bit (32) disposed on the face end.

* * * * *